Patented July 27, 1937

2,088,405

UNITED STATES PATENT OFFICE 2,088,405

METHOD OF AND MEANS FOR FIXING ADHESIVE COATED DEVICES

Leo Cahn, Woodside, N. Y., assignor to Consolidated Decalcomania Corporation, Brooklyn, N. Y., a corporation of New York No Drawing. Application May 25, 1936,
Serial No. 81,646

26 Claims. (Cl. 216—62)

This invention relates to the art of affixing adhesive coated or treated materials or devices, especially printed matter such as labels, decalcomanias, stamps, etc., to highly polished or other surfaces which are poorly responsive or non-responsive to the water-soluble or water-sensitive adhesive of such materials or devices. Although useful for other purposes, this invention is concerned primarily with the art of affixing adhesive coated or treated materials to surfaces of plastic materials, as for example, to articles made of synthetic resins, such as the condensation products of phenol-formaldehyde, phthalic anhydridglycerine, urea-formaldehyde, etc., to articles made of the derivatives of cellulose, esters and ethers, hard rubber, and the like; to articles having baked, lacquered, enameled, or lithographed finishes; to fabrics such as oil cloth and patent leather; and to metals and metal plated objects. The invention is also concerned with one or more compositions to be utilized in practicing the present method.

The adhesive with which labels, decalcomanias, stamps, and other materials or devices intended to be affixed to the surfaces of certain articles are provided is usually of the water-soluble or water-sensitive type, such as the adhesives derived from fish or animal glue, dextrin, gelatin, gum arabic, and the like.

Heretofore it has been substantially impossible to securely and permanently affix materials having such adhesive surfaces to surfaces of the above mentioned types, and it is well known that such materials, as for example, labels or decalcomanias, when affixed to such surfaces adhere very poorly, if at all, to the latter and in many cases become detached after a short time, that is, after the moisture has evaporated. In the more favorable cases, that is where the labels or decalcomanias do not become detached after the evaporation of the moisture, there is nevertheless a very poor adhesive bond between the labels or decalcomanias and the surfaces to which they have been applied, with the result that they become partially or entirely detached from the objects in the course of handling the latter. It is, therefore, an object of the present invention to eliminate these difficulties, and for that purpose to provide a method of and means for obtaining a secure and substantially permanent union between water-soluble adhesive coated or treated materials and highly polished or other surfaces in connection with which the problem exists.

I have discovered that one of the reasons that give rise to the difficulty in affixing the adhesive coated or treated materials to surfaces of the character referred to arises from the fact that such surfaces resist wetting by water or aqueous solutions, because water has a very high surface tension. Accordingly when labels or decalcomanias are moistened with water and then applied to such surfaces, there is very little or no adhesion, as the moisture instead of being distributed uniformly over the surface covered by the label or decalcomania gathers in numerous incoherent drops. In accordance with the present invention the difficulty due to the high surface tension of the water used in moistening the labels, decalcomanias, etc. is overcome by the application of an agent to the surfaces referred to which lowers the surface tension of the water or of the aqueous solution which is used to moisten the labels, decalcomanias, etc. Thus, for example, the surface tension of water and aqueous solutions, which is normally about 72 to 75 dyn/cm. against air may be lowered to less than one-half, that is, to approximately 35 dyn/cm. by the addition of about twenty-five parts by weight of ethanol. Approximately the same result is obtained by the addition of a salt of a sulphuric acid ester with an alcohol of a high C-number, as for instance, a solution of one-half of one percent of the sodium salt of sulphuric acid with dodecylic alcohol ($C_{12}H_{25}SO_3$) Na in water. Numerous other substances can be used for lowering the surface tension of aqueous solutions, for example, the organic solvents which are miscible with water, such as acetone, the lower alcohols, the ethylene-glycol-ethers, etc.; and numerous other organic compounds such as the soap-type compounds, the sulfonated alcohols, the toluidines, lower the surface tension of water or aqueous solutions when dissolved therein.

I have discovered that another cause of the failure of water-soluble adhesive coated or treated materials to properly adhere to surfaces of the character with which the present invention is concerned, is the extreme smoothness of such surfaces. This difficulty is overcome in accordance with the present invention by treating such surfaces to reduce to some extent the smoothness thereof, and for that purpose, alkali solutions have been found effective. The alkalies suitable for this purpose include the hydroxides of the alkali and earth-alkali groups, their salts which become alkalized in water by hydrolyzation, as for example, sodium carbonate and sodium tetraborate, and also the organic alkali compounds, for example the quarternary ammonium bases. Preferably the alkali should be used together with a solvent therefor, such solvent being both compatible with the alkali and having a low evaporation rate.

As was hereinbefore described the high surface tension of water or of aqueous solutions utilized in moistening the labels, decalcomanias, etc. is one of the principal causes of the difficulty in obtaining a good adhesive bond between the labels, decalcomanias, etc. and the surfaces to which they are applied. On the other hand, as just pointed out, it is frequently important to utilize an alkali for the purposes of treating surfaces to reduce their smoothness. Aqueous alkali solutions, however, have surface tensions which in some cases are even higher than that of water. Accordingly when applied to the surfaces with which the present invention is concerned, such alkali solutions do not have the desired effect. Therefore, if such alkali solutions are to be employed in accordance with the present invention they should be used in combination with an agent for lowering their surface tensions. In some cases, the surfaces under consideration showed a high resistance against the above mentioned alkali solutions. Experiments showed the reaction of alkali upon the surfaces was very slow and it took time to produce an appreciable modification of the smooth and polished surfaces. In this case, it proved to be advantageous to incorporate into the alkali solution, a slowly evaporating solvent, mixable with alkali, to prolong the etching effect of the alkali for a period of time, even after the label, etc., has been affixed. Such solvents are, for instance, ethylene-glycol and its high-boiling derivatives.

Another cause of the difficulty in adhesively affixing water-soluble adhesive treated or coated materials to surfaces of the character here involved is due, as I have discovered, to the presence on such surfaces of waxy, oily or greasy materials which are present usually in the form of a thin coating. These materials are usually formed on the surfaces referred to incidentally during the manufacturing and finishing operations of the products. Such waxy, oily, or greasy materials are water-repellant and therefore resist wetting of the surface by the water or aqueous solution with which the labels or decalcomanias are treated for affixing the latter to such surfaces. This difficulty is partially obviated by the treatment of the surfaces with the alkali as described above, as the greases and waxes are saponified by the alkali and thus removed from the surfaces in the form of emulsions. Likewise the fatty oils may similarly be saponified and removed. However, unsaponifiable greasy materials, for example, paraffin, vaseline, etc. cannot be loosened or removed with alkali. Therefore, in accordance with the present invention there is utilized for the purposes of removing oils, greases, and waxes, a cleaning solvent and for that purpose any of the following are suitable, that is, aromatic and aliphatic hydrocarbons and their derivatives; alcohols, ethers, esters, aldehydes and ketones; hydro-aromatic compounds, of which turpentine is representative, chlorinated hydrocarbons. The incorporation of these organic solvents into the aqueous solutions is accomplished by means of a mutual solvent such as the glycol-ethers.

As hereinafter stated, the liquids are applied to the objects by means of a cloth with a wiping action whereby a large part, if not all, of the grease, oil, etc. is removed, but even if the grease or oil is not removed the solvent therefor in said liquids breaks up the oil or grease films so that the other ingredients of said liquids can reach the underlying surfaces of the objects and effectively condition the latter for the adhesive attachment of the decalcomanias, stamps, etc. applied in accordance with this invention.

In order to more fully explain the invention the following examples of specific compositions which have given excellent results are set forth:

Example 1

| | Parts by weight |
|---|---|
| Alkali solution (20% potassium hydroxide in water) | 20 |
| Ethyl alcohol | 20 |
| Ethylene-glycol-mono-butyl-ether | 30 |
| Turpentine | 20 |

Example 2

| | Parts by weight |
|---|---|
| Triethanolamine | 40 |
| Ethyl alcohol | 30 |
| Benzol | 30 |

In the composition of Example 1 the functions of the ingredients specified are as follows: The aqueous alkali solution acts as an etching agent to reduce the smoothness of the surface to which the labels, decalcomanias, or other devices are affixed; the ethyl alcohol acts as an agent for lowering the surface tension; and the ethylene-glycol-mono-butyl-ether is a mutual solvent for the alcohol-alkali solution on the one hand and for the turpentine, which is a cleaning solution for the oily, fatty and greasy materials, on the other hand. It should be observed that the ethylene-glycol-mono-butyl-ether has a very slow evaporation rate, that is, fifty times slower than benzol and about eight times slower than water.

In the composition of Example 2, the triethanolamine is the alkali which constitutes the agent for reducing the smoothness of the surfaces; the ethyl alcohol serves to lower the surface tension of the solution, and the benzol is a cleaning agent for removing the oily, fatty and greasy materials. An additional solvent, such as the ethyl-glycol-mono-butyl-ether in the formula of Example 1, is unnecessary in the formula of Example 2 because all of the solutions of the ingredients of Example 2 are completely miscible. Furthermore a slowly volatile solvent is unnecessary because the triethanolamine answers the purpose thereof. Thus it is apparent that one of the ingredients used in the composition in accordance with the present invention may have one or more properties which render such ingredient suitable for several purposes of the present invention, as for example, as has just been observed, the triethanolamine of the formula of Example 2 is an alkali which has a slow evaporation rate and as was observed in connection with the formula of Example 1, the ethyl-glycol-mono-butyl-ether besides constituting a mutual solvent for the several ingredients also has a very slow evaporation rate. It will be understood also that the present invention and the compositions utilized in practicing the same comprehends emulsions as well as solutions, as it is a well known fact that emulsions of organic solvents and aqueous solutions can be produced by the aid of an emulsifying agent, which incidentally is always an agent for lowering the surface tension of such solutions.

The surface tension of the liquid containing the ingredients of Example 1 is approximately 28 dyn/cm., and that of Example 2 is approximately 31 dyn/cm., both measured in accordance with the capillary method, with water as a standard of 72 dyn/cm. It will be understood, however, that while the liquids having the surface tensions here referred to give excellent results, compositions having other surface tensions lower than that of water may be used, and that the surface tension necessary for optimum results will vary in accordance with the nature of the surface to which the labels, decalcomanias or other devices are to be applied. With respect to the alkali concentration of the final solution, the best results have been obtained with an alkali concentration of from one percent to ten percent potassium hydroxide or an equivalent amount of other alkali, but the alkali concentration may be increased to any extent that will not interfere with the miscibility of the alkali with the other ingredients of the composition. The lower limit of alkali concentration which works satisfactorily was found to be about pH–8.5, and all alkali concentrations between pH–8.5 and pH– approximately 14 gave satisfactory results.

In using the compositions in accordance with the present invention, a small amount of the liquid is applied to the surface to which the labels, decalcomanias, or other devices, are to be affixed, preferably before the latter are applied. The composition is spread over such surfaces evenly with a cloth with a slight wiping action, it being necessary to apply only a very thin film of the liquid. Said liquid may be applied immediately before the labels, decalcomanias, or other devices are contacted with the surfaces, or a substantial length of time before the said devices are affixed. It will be also understood that instead of applying the composition to the surfaces of the objects, said composition may be applied to the surfaces of the labels or other devices to be affixed to said objects. Further, especially in the case of decalcomanias, the compositions can be incorporated in the water or other liquid which is used for releasing the decalcomania transfers from their carriers.

Thus, it is seen that the methods and compositions herein disclosed are well adapted to accomplish the several objects of the present invention. It will be understood, however, that said methods and compositions are subject to variations, which will occur to those skilled in the art in view of the present disclosure. Also, in certain cases, depending upon the character of the surfaces to which the labels, decalcomanias or other devices are to be applied, one or more of the ingredients of the compositions may be omitted. Accordingly, I do not wish to be limited precisely to the present disclosure, except as may be required by the appended claims.

What I claim as new and useful is:

1. The method of affixing devices such as labels, decalcomanias, stamps, and the like having normally dry water-soluble or water-sensitive adhesive surfaces to objects composed of plastic materials such as synthetic resins, hard rubber, etc., or to other objects having smooth or highly polished surfaces, which method comprises wetting a portion of the surfaces of such objects with a liquid of low surface tension, and then applying said devices to said objects on the wetted surface portions thereof while the latter are wet, with said adhesive surfaces in contact with said wetted surface portions.

2. The method of affixing devices such as labels, decalcomanias, stamps, and the like having water-soluble or water-sensitive adhesive surfaces to objects composed of plastic materials such as synthetic resins, hard rubber, etc., or to other objects having smooth or highly polished surfaces, which method comprises wetting a portion of the surfaces of such objects with an alkaline liquid of low surface tension and having a rate of evaporation lower than that of water, and then applying said devices to said objects on the wetted surface portions thereof while the latter are wet with said adhesive surfaces in contact with said wetted surface portions.

3. The method of affixing devices such as labels, decalcomanias, stamps, and the like having normally dry water-soluble or water-sensitive adhesive surfaces to objects composed of plastic materials such as synthetic resins, hard rubber, etc., or to other objects having smooth or highly polished surfaces, which method comprises treating said surfaces with an agent to render the same capable of being readily wetted by water or by an aqueous solution, wetting said surfaces with water or with an aqueous solution, and then applying said devices to said objects on the wetted surface portions thereof while the latter are wet, with said adhesive surfaces in contact with said wetted surface portions.

4. The method of affixing devices such as labels, decalcomanias, stamps, and the like having normally dry water-soluble or water-sensitive adhesive surfaces to objects composed of plastic materials such as synthetic resins, hard rubber, etc., or to other objects having smooth or highly polished surfaces, which method comprises wetting a portion of the surfaces of such objects with a liquid of low surface tension, and containing a solvent for greases, oils and waxes, and then applying said devices to said objects on the wetted surface portions thereof while the latter are wet, with said adhesive surfaces in contact with said wetted surface portions.

5. The method of affixing devices such as labels, decalcomanias, stamps, and the like having normally dry water-soluble or water-sensitive adhesive surfaces to objects composed of plastic materials such as synthetic resins, hard rubber, etc., or to other objects having smooth or highly polished surfaces, which method comprises wetting a portion of the surfaces of such objects with an alkaline liquid of low surface tension, and containing a solvent for greases, oils and waxes, and then applying said devices to said objects on the wetted surface portions thereof while the latter are wet, with said adhesive surfaces in contact with said wetted surface portions.

6. The method of affixing devices such as labels, decalcomanias, stamps, and the like having normally dry water-soluble or water-sensitive adhesive surfaces to objects composed of plastic materials such as synthetic resins, hard rubber, etc., or to other objects having smooth or highly polished surfaces, which method comprises wetting a portion of the surfaces of such objects with a liquid of low surface tension, containing an alcohol, and then applying said devices to said objects on the wetted surface portions thereof while the latter are wet, with said adhesive surfaces in contact with said wetted surface portions.

7. The method of affixing devices such as labels, decalcomanias, stamps, and the like having water-soluble or water-sensitive adhesive surfaces to objects composed of plastic materials such as snythetic resins, hard rubber, etc., or to other objects having smooth or highly polished surfaces, which method comprises wetting a portion of the surfaces of such objects with a liquid of low surface tension and having a rate of evaporation lower than that of water, containing an alkali and an alcohol, and then applying said devices to said objects on the wetted surface portions thereof while the latter are wet, with said adhesive surfaces in contact with said wetted surface portions.

8. The method of affixing devices such as labels, decalcomanias, stamps, and the like having normally dry water-soluble or water-sensitive adhesive surfaces to objects composed of plastic materials such as synthetic resins, hard rubber, etc., or to other objects having smooth or highly polished surfaces, which method comprises wetting a portion of the surfaces of such objects with a liquid of low surface tension, containing an alkali, an alcohol, a solvent for oils, greases and waxes, and a mutual solvent for said alkali, alcohol and said oil, grease and wax solvent, and then applying said devices to said objects on the wetted surface portions thereof while the latter are wet, with said adhesive surfaces in contact with said wetted surface portions.

9. The method of affixing devices such as labels, decalcomanias, stamps, and the like having water-soluble or water-sensitive adhesive surfaces to objects composed of plastic materials such as synthetic resins, hard rubber, etc., or to other objects having smooth or highly polished surfaces, which method comprises wetting a portion of the surfaces of such objects with a liquid of low surface tension, containing an alkali solution, ethyl alcohol, ethylene-glycol-mono-butyl-ether, and turpentine, and then applying said devices to said objects on the wetted surface portions thereof while the latter are wet, with said adhesive surfaces in contact with said wetted surface portions.

10. The method of affixing devices such as labels, decalcomanias, stamps, and the like having water-soluble or water-sensitive adhesive surfaces to objects composed of plastic materials such as synthetic resins, hard rubber, etc., or to other objects having smooth or highly polished surfaces, which method comprises wetting a portion of the surfaces of such objects with a liquid of low surface tension, containing triethanolamine, ethyl alcohol, and benzol, and then applying said devices to said objects on the wetted surface portions thereof while the latter are wet, with said adhesive surfaces in contact with said wetted surface portions.

11. A composition for improving the adhesive union between labels, decalcomanias, stamps or other devices having water-soluble or water-sensitive adhesive surfaces and objects having smooth surfaces, said composition comprising an alkaline liquid having a rate of evaporation lower than that of water and containing an agent for lowering the surface tension of said liquid below that of water.

12. A composition for improving the adhesive union between labels, decalcomanias, stamps or other devices having water-soluble or water-sensitive adhesive surfaces and objects having smooth surfaces, said composition comprising an alkaline liquid having a rate of evaporation lower than that of water and containing an agent for lowering the surface tension of said liquid below that of water and a solvent for waxy and greasy materials.

13. In a method of affixing material having a normally dry water-soluble or water-sensitive adhesive surface to the surface of an object composed of synthetic resins or to a surface which is smooth or highly polished, the steps of wetting at least one of said surfaces with a liquid having a surface tension which is low compared to that of water and a rate of evaporation which is lower than that of water, and then applying said material to the surface of said object, while said wetted surface is wet, with the adhesive surface in contact with said object surface.

14. In a method of affixing material having a water-soluble or water-sensitive adhesive surface to the surface of an object composed of synthetic resins or to a surface which is smooth or highly polished, the steps of wetting at least one of said surfaces with a liquid having a rate of evaporation lower than that of water and containing an alkali and an alcohol, and then applying said material to the surface of said object, while said wetted surface is wet, with the adhesive surface in contact with said object surface.

15. In a method of affixing material having a normally dry water-soluble or water-sensitive adhesive surface to the surface of an object composed of synthetic resins or to a surface which is smooth or highly polished, the steps of wetting at least one of said surfaces a liquid containing an alkali, an alcohol and a solvent for oil, grease, and wax, wiping the wet surfaces to remove oil, grease or wax therefrom and then applying said material to the surface of said object, while said wetted surface is wet, with the adhesive surface in contact with said object surface.

16. In a method of affixing material having a water-soluble or water-sensitive adhesive surface to the surface of an object composed of synthetic resins or to a surface which is smooth or highly polished, the step of applying to at least one of said surfaces a composition comprising the following ingredients substantially in the proportions specified:

| | Parts by weight |
|---|---|
| Alkali solution (20% potassium hydroxide in water) | 20 |
| Ethyl alcohol | 20 |
| Ethylene-glycol-mono-butyl-ether | 30 |
| Turpentine | 20 |

17. In a method of affixing material having a water-soluble or water-sensitive adhesive surface to the surface of an object composed of synthetic resins or to a surface which is smooth or highly polished, the step of applying to at least one of said surfaces a composition comprising the following ingredients substantially in the proportions specified:

| | Parts by weight |
|---|---|
| Triethanolamine | 40 |
| Ethyl alcohol | 30 |
| Benzol | 30 |

18. The method of affixing decalcomanias to the surfaces of objects, which comprises moistening said decalcomanias in a liquid having a surface tension substantially less than that of water and while said decalcomanias are wet contacting the same with the surfaces of said objects.

19. The method of affixing decalcomanias to the surfaces of objects, which comprises moistening said decalcomanias in an alkaline liquid having a surface tension substantially less than that of water and while said decalcomanias are wet contacting the same with the surfaces of said objects.

20. The method of affixing decalcomanias to the surfaces of objects, which comprises moistening said decalcomanias in an alkaline liquid having a surface tension substantially less than that of water and containing a solvent for oil, grease and wax, and while said decalcomanias are wet contacting the same with the surfaces of said objects.

21. The method of applying decalcomanias which have water-releasable transfers provided with water-soluble or water-sensitive adhesive surfaces for attaching said transfers to the suraces of objects, which comprises moistening said decalcomanias in a liquid having a surface tension substantially less than that of water and while said decalcomanias are wet contacting the same with the surfaces of said objects.

22. The method of applying decalcomanias which have water-releasable transfers provided with water-soluble or water-sensitive adhesive surfaces for attaching said transfers to the surfaces of objects, which comprises moistening said decalcomanias in an alkaline liquid having a surface tension substantially less than that of water and while said decalcomanias are wet contacting the same with the surfaces of said objects.

23. The method of applying decalcomanias which have water-releasable transfers provided with water-soluble or water-sensitive adhesive surfaces for attaching said transfers to the surfaces of objects, which comprises moistening said decalcomanias in an alkaline liquid having a surface tension substantially less than that of water and containing a solvent for oil, grease and wax, and while said decalcomanias are wet contacting the same with the surfaces of said objects.

24. The method of applying decalcomanias which have water-releasable transfers provided with water-soluble or water-sensitive adhesive surfaces for attaching said transfers to the surfaces of objects, which comprises moistening said decalcomanias in a liquid having a surface tension substantially less than that of water and a rate of evaporation less than that of water, and while said decalcomanias are wet contacting the same with the surfaces of said objects.

25. The method of applying decalcomanias which have water-releasable transfers provided with water-soluble or water-sensitive adhesive surfaces for attaching said transfers to the surfaces of objects, which comprises moistening said decalcomanias in an alkaline liquid having a surface tension substantially less than that of water and a rate of evaporation less than that of water, and while said decalcomanias are wet contacting the same with the surfaces of said objects.

26. The method of applying decalcomanias which have water-releasable transfers provided with water-soluble or water-sensitive adhesive surfaces for attaching said transfers to the surfaces of objects, which comprises moistening said decalcomanias in an alkaline liquid having a surface tension substantially less than that of water and a rate of evaporation less than that of water, and containing a solvent for oil, grease and wax, and while said decalcomanias are wet contacting the same with the surfaces of said objects.

LEO CAHN.